US009282478B2

(12) United States Patent
Jiang et al.

(10) Patent No.: US 9,282,478 B2
(45) Date of Patent: Mar. 8, 2016

(54) METHOD, SYSTEM AND DEVICE FOR TRIGGERING AND PERFORMING SPECTRUM SENSING

(75) Inventors: Chenggang Jiang, Beijing (CN); Yuanyuan Li, Beijing (CN); Wenling Bai, Beijing (CN); Yu Yang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 91 days.

(21) Appl. No.: 14/125,083
(22) PCT Filed: Mar. 27, 2012
(86) PCT No.: PCT/CN2012/073099
§ 371 (c)(1),
(2), (4) Date: Dec. 9, 2013

(87) PCT Pub. No.: WO2012/167649
PCT Pub. Date: Dec. 13, 2012

(65) Prior Publication Data
US 2014/0120970 A1 May 1, 2014

(30) Foreign Application Priority Data
Jun. 9, 2011 (CN) .......................... 2011 1 0154299

(51) Int. Cl.
*H04B 15/00* (2006.01)
*H04W 24/08* (2009.01)
(Continued)

(52) U.S. Cl.
CPC ............. *H04W 24/08* (2013.01); *H04W 16/14* (2013.01); *H04W 72/0426* (2013.01); *H04W 72/082* (2013.01)

(58) Field of Classification Search
CPC ............ H04W 16/14; H04W 72/0426; H04W 72/082; H04W 84/18; H04W 72/02; H04W 72/085; H04W 24/00
USPC .............. 455/500, 501, 517, 67.11, 502, 504, 455/507, 508, 509, 512, 515, 423–425, 455/422.1, 403, 550.1, 67.13, 69, 445, 455/426.1, 426.2; 370/310, 328, 329.343, 370/338, 503, 510, 350
See application file for complete search history.

(56) References Cited

U.S. PATENT DOCUMENTS

2008/0020751 A1    1/2008  Li et al.
2008/0165754 A1*   7/2008  Hu ................................ 370/342
(Continued)

FOREIGN PATENT DOCUMENTS

CN    101459962 A    6/2009
CN    101667872 A    3/2010
(Continued)

OTHER PUBLICATIONS

PCT International Search Report for PCT Counterpart Application No. PCT/CN2012/073099, 5 pgs., (Jun. 28, 2012).
(Continued)

*Primary Examiner* — Keith Ferguson
(74) *Attorney, Agent, or Firm* — Blakely, Sokoloff, Taylor & Zafman LLP

(57) ABSTRACT

The embodiments of the present application relate to the technical field of wireless communications, and in particular to a method, system and device for triggering and performing spectrum sensing, used for solving the problem in the prior art that if the sensing period is set too long, a decline of service quality between an authorization system and a cognitive system or even a network paralysis will be caused due to interference; and if the sensing period is set too short, an increase in power consumption of devices and a waste of spectrum resources will be caused. The method for performing spectrum sensing in the embodiments of the present application includes: a sensing node judging whether or not the channel quality has declined to the requirement for performing in-band spectrum sensing; and after determining that the channel quality has declined to the requirement for performing in-band spectrum sensing, the sensing node performing in-band spectrum sensing. By way of applying the embodiments of the present application, the problems of decline of service quality between an authorization system and a cognitive system or even a network paralysis due to interference caused by setting the sensing period too long, or an increase in power consumption of devices and a waste of spectrum resources caused by setting period too short, can be avoided.

20 Claims, 2 Drawing Sheets

(51) Int. Cl.
*H04W 16/14* (2009.01)
*H04W 72/04* (2009.01)
*H04W 72/08* (2009.01)

(56) References Cited

U.S. PATENT DOCUMENTS

| | | | |
|---|---|---|---|
| 2010/0069013 | A1 | 3/2010 | Chaudhri et al. |
| 2010/0135226 | A1* | 6/2010 | Chandramouli et al. ..... 370/329 |
| 2010/0303026 | A1* | 12/2010 | Chaudhri et al. ............. 370/329 |
| 2011/0045862 | A1 | 2/2011 | Um et al. |
| 2011/0130101 | A1 | 6/2011 | Jung et al. |

FOREIGN PATENT DOCUMENTS

| | | |
|---|---|---|
| CN | 101808334 A | 8/2010 |
| CN | 101925169 A | 12/2010 |
| CN | 102215076 A | 10/2011 |
| EP | 0 932 318 A2 | 7/1999 |
| EP | 2 157 830 A1 | 2/2010 |

OTHER PUBLICATIONS

PCT Written Opinion of the International Searching Authority for counterpart PCT Application No. PCT/CN2012/073099, 20 pp. (including English translation), (Jun. 28, 2012).

PCT Notification Concerning Transmittal of International Preliminary Report on Patentability (Chapter I of the Patent Cooperation Treaty) for counterpart PCT Application No. PCT/CN2012/073099, 23 pp. (including English translation), (Dec. 27, 2013).

European Patent Office Communication enclosing Extended European Search Report for corresponding European Patent Application No. 12797527.4, 8 pp., (Oct. 28, 2015).

* cited by examiner

METHOD, SYSTEM AND DEVICE FOR TRIGGERING AND PERFORMING SPECTRUM SENSING

CROSS-REFERENCE TO RELATED APPLICATIONS

The present application is a U.S. National Stage under 35 U.S.C. §371 of International Application No. PCT/CN2012/073099, filed on Mar. 27, 2012, entitled METHOD, SYSTEM AND DEVICE FOR TRIGGERING AND PERFORMING SPECTRUM SENSING, designating the United States, and claiming priority to Chinese Patent Application No. 201110154299.2, filed with the State Intellectual Property Office of China on Jun. 9, 2011 and entitled "Method, system and device for triggering and performing spectrum sensing", which was incorporated by reference in its entirety.

FIELD OF THE INVENTION

The present invention relates to the field of wireless communication technologies and particularly to a method, a system and a device for triggering and performing spectrum sensing.

BACKGROUND OF THE INVENTION

Along with rapid development in the industry of mobile communications, there is an increasingly distinct contradiction between an increasing demand for broadband wireless communication and a limited number of spectrum resources, and although Orthogonal Frequency Division Multiplexing (OFDM), Multiple Input Multiple Output (MIMO) and other technologies have been adopted in the Long Term Evolution (LTE), these cannot solve the problem of the limited number of spectrum resources thoroughly. Along with rapid development of mobile services in future, telecommunication operators will be faced with a more serious problem of the insufficient spectrum resources, and on the other hand, the spectrum use of some wireless systems is almost left unused temporally and geographically, for example, many of radio and television frequency bands have been left unused for a long time because a transmission capacity can be improved greatly by digital transmission along with evolvement of radio and television systems from analog transmission to digital transmission.

In order to solve the problem of the insufficient spectrum resources, a new radio technology, i.e., Cognitive Radio (CR), has been widely regarded. With the technology of cognitive radio, a radio system can adapt its operating parameter to its demand dependent upon its operating environment. Cognitive radio in cooperation with software radio can enable flexible use of a spectrum, have the spectrum shared and improve the efficiency of the spectrum in use.

For a typical cognitive radio system, when it is found that an authorized system is not in operation and an authorized frequency band is unused, the cognitive system makes use of the authorized frequency band and continues to detect the operating status of the authorized system in the authorized frequency band, and once it is found that the authorized system restarts its operation, a cognitive node quits the authorized frequency band and transfers to a new frequency band for further operation. Throughout this flow, the cognitive system needs to perform spectrum sensing, make a spectrum decision and transfer the spectrum. Spectrum sensing is to obtain information about a radio environment, and spectrum management is to perform corresponding management on available frequency bands according to the obtained information about the radio environment to thereby improve the efficiency of the spectrum in use; and when the authorized system starts its operation, the cognitive system needs to transfer to a new operating frequency band in order to avoid serious interference to a primary user.

Spectrum sensing is a technology in the cognitive radio system, and the cognitive node is a node in the cognitive system to perform spectrum sensing. Spectrum sensing is currently performed in two operating modes of distributed and centralized. In the distributed mode, the cognitive node in the cognitive system is separately in operation, and when it is determined that the authorized frequency band is unused, the cognitive system makes use of the authorized frequency band, and the cognitive node continues to detect the operating status of the authorized system in the frequency band, and once it is found that the authorized system restarts its operation, the cognitive system quits the frequency band; and in the centralized mode, the cognitive node in the cognitive system notifies a central node when determining that the authorized frequency band is idle, and the central node notifies the cognitive system of whether this frequency band is available, and the cognitive node notifies the central node after determining that the authorized system restarts its operation, and the central node notifies the cognitive system of whether to quit the frequency band.

The addition of the cognitive function to the wireless communication system can enhance the flexibility of the spectrum in use based upon an existing spectrum allocation policy to improve a network capacity greatly and ease the tension spectrum for telecommunication operators. An initial task of cognitive radio is to obtain information about a radio operating environment, which can be obtained through spectrum sensing, that is, a signal of a transmitter of the authorized system in a target frequency band is detected to thereby determine whether the target frequency band is available. When the target frequency band is available, the frequency band is used for cognitive radio; and when the cognitive radio system makes use of a frequency band of the authorized system, the cognitive node in the cognitive system still needs to trigger sensing periodically as to whether the authorized system restarts its operation in the current operating frequency band, and once the cognitive node finds that the authorized system reuses the frequency band, the cognitive system needs to transfer to another frequency band for further operation.

When the cognitive system makes use of a frequency band of the authorized system, spectrum sensing in the operating frequency band (in-band) is subjected to interference of the current system so that the performance of detection may not be satisfied, so a common practice is to have the cognitive radio system kept silent during spectrum sensing. The cognitive system is disabled for communication in the course of sensing during the silent period.

Existing spectrum sensing detects a signal of the authorized system in the operating frequency band (in-band) periodically in the silent period. If the sensing period is too long, after the authorized system comes into use, the cognitive node cannot find the authorized system in a timely manner, and the cognitive system continues its operation so that the authorized system is subjected to interference from the cognitive system for a long period of time, thus degrading a quality of service of the authorized system, and also the cognitive system is subjected to interference from the signal of the authorized system, thus degrading a quality of service and even seriously causing a breakdown through the network. If the sensing period is too short, then both system overhead of spectrum sensing and power consumption of a device may be increased significantly, and radio silence required by spectrum sensing may result in a waste of spectrum resources, for example, taking the sensing period of 100 ms as an example, if the silent period during spectrum sensing is 20 ms, then 20% of spectrum resources will be wasted.

In summary, currently if the sensing period is set too long, then interference between the authorized system and the cognitive system may result in a degraded quality of service and even a network breakdown; and if the sensing period is set too short, then power consumption of devices may be increased and spectrum resources will be wasted.

SUMMARY OF THE INVENTION

Embodiments of the invention provide a method, a system and a device for triggering and performing spectrum sensing so as to solve the problems in the prior art of degrading of a quality of service of an authorized system and a cognitive system or even a network breakdown due to interference therebetween caused by setting the sensing period too long, or an increase in power consumption of devices and a waste of spectrum resources caused by setting the sensing period too short.

An embodiment of the invention provides a method for performing spectrum sensing, the method including:

judging, by a cognitive node, whether or not the channel quality has declined to the requirement for performing in-band spectrum sensing; and performing, by the cognitive node, in-band spectrum sensing upon determining that the channel quality has declined to the requirement for performing in-band spectrum sensing.

An embodiment of the invention provides a method for triggering spectrum sensing, the method including:

judging, by a central node, whether or not the channel quality has declined to the requirement for performing in-band spectrum sensing; and triggering, by the central node, cognitive nodes to perform in-band spectrum sensing upon determining that the channel quality has declined to the requirement for performing in-band spectrum sensing.

An embodiment of the invention provides a device for performing spectrum sensing, the device including:

a first determining module configured to judge whether or not the channel quality has declined to the requirement for performing in-band spectrum sensing; and a sensing module configured to perform in-band spectrum sensing when it is determined that the channel quality has declined to the requirement for performing in-band spectrum sensing.

An embodiment of the invention provides a device for triggering spectrum sensing, the device including:

a second determining module configured to judge whether or not the channel quality has declined to the requirement for performing in-band spectrum sensing; and a triggering module configured to trigger cognitive nodes to perform in-band spectrum sensing when it is determined that the channel quality has declined to the requirement for performing in-band spectrum sensing.

An embodiment of the invention provides a system for performing spectrum sensing, the system including:

cognitive nodes each configured to determine from channel quality information and notify a central node of a channel quality condition and to determine that the channel quality has declined to the requirement for performing in-band spectrum sensing and perform in-band spectrum sensing upon reception of an instruction to trigger spectrum sensing from the central node; and the central node configured to judge from the received channel quality conditions whether or not the channel quality has declined to the requirement for performing in-band spectrum sensing and to trigger the cognitive nodes to perform in-band spectrum sensing upon determining that the channel quality has declined to the requirement for performing in-band spectrum sensing.

In the embodiments of the invention, in-band spectrum sensing is performed without setting a sensing period upon determining the channel quality has declined to the requirement for performing in-band spectrum sensing, thereby avoiding the problems of degrading of a quality of service of an authorized system and a cognitive system or even a network breakdown due to interference therebetween caused by setting the sensing period too long, or an increase in power consumption of devices and a waste of spectrum resources caused by setting the sensing period too short.

DETAILED DESCRIPTION OF THE EMBODIMENTS

A cognitive node according to an embodiment of the invention judges whether or not the channel quality has declined to the requirement for performing in-band spectrum sensing and performs in-band spectrum sensing upon determining that the channel quality has declined to the requirement for performing in-band spectrum sensing. In-band spectrum sensing is performed without setting a sensing period upon determining that the channel quality has declined to the requirement for performing in-band spectrum sensing, thereby avoiding the problems of degrading of a quality of service of an authorized system and a cognitive system or even a network breakdown due to interference therebetween caused by setting the sensing period too long, or an increase in power consumption of devices and a waste of spectrum resources caused by setting the sensing period too short.

Performance of in-band spectrum sensing in the embodiment of the invention refers to that the cognitive node detects a spectrum use status at an operating frequency of the current system.

When the cognitive node detects that the authorized system reuses the operating frequency of the current system, the cognitive system needs to obviate the frequency in a timely manner and transfer to an appropriate spare frequency for operation.

Embodiments of the invention will be further described below in details with reference to the drawings.

Figure 1:
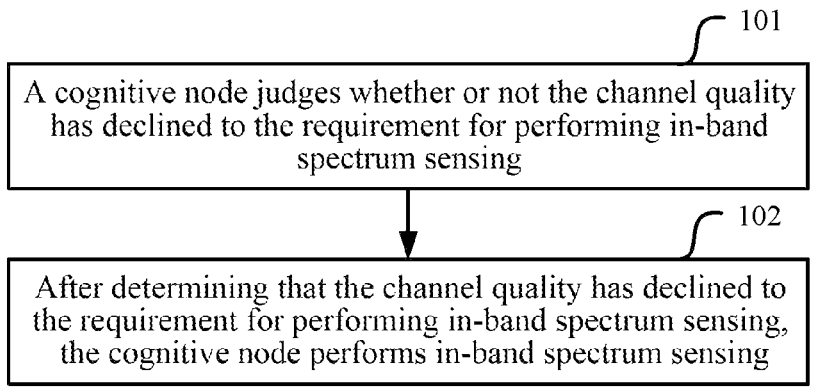
FIG. 1 is a schematic flow chart of a method for performing spectrum sensing according to an embodiment of the invention.

As illustrated in FIG. 1, a method for performing spectrum sensing according to an embodiment of the invention includes the following steps.

Step 101. A cognitive node judges whether or not a channel quality has declined to a requirement for performing in-band spectrum sensing.

Step 102. The cognitive node performs in-band spectrum sensing upon determining that the channel quality has declined to the requirement for performing in-band spectrum sensing.

In an implementation, there are two scenarios in the embodiment of the invention, i.e., distributed and centralized scenarios.

In the distributed scenario, the cognitive node is capable of executing an independent cognitive action. When a communication quality declines to some extent as per a monitored index of the communication quality, it is considered that an authorized system at an operating frequency of the current system may possibly have come into use, and the cognitive node performs a spectrum sensing process. For example, the cognitive node triggers an in-band spectrum sensing process when an average of interference measurement in a period of time x is above a liminal value or there are a number of consecutive NACKs for feedbacks transmitted over an uplink/downlink service channel in the period of time x or there is a dramatic drop in received power or there is out of synchronization in uplink/downlink.

In the centralized scenario, the spectrum sensing process is controlled by a central node. If a cognitive node monitors the communication quality in the current system independently and reports in 1-bit information (0/1 information) to the central node periodically as to whether or not the communication quality has declined, where the 1-bit information is reported as 1 when the communication quality declines to some extent; otherwise, the 1-bit information is reported as 0. The central node accumulates and processes report results, and triggers the cognitive node to perform in-band spectrum sensing if the processing result is above a liminal value.

They will be introduced below respectively.

In the distributed scenario:

Preferably, in the step 101, the cognitive node judges from channel quality information whether or not the channel quality has declined to the requirement for performing in-band spectrum sensing.

The channel quality information includes but will not be limited to at least one of the following information:

an interference value, a received power value of a useful signal, feedback information, a synchronization status and Cyclic Redundancy Check (CRC) information.

If the channel quality information includes an interference value, then preferably in the step 101, if the interference value is consecutively measured above a first liminal value for a preset first length of time, then the cognitive node determines that the channel quality has declined to the requirement for performing in-band spectrum sensing, for example, with the first liminal value of 20 and the first length of time of 60 s, the interference value is above 20 for 60 s, and then it is determined that the channel quality has declined to the requirement for performing in-band spectrum sensing.

If the channel quality information includes a received power value of a useful signal, then preferably in the step 101, if the received power value of the useful signal is consecutively below a second liminal value for a preset second length of time, then the cognitive node determines that the channel quality has declined to the requirement for performing in-band spectrum sensing, for example, with the second liminal value of 25, and the second length of time of 3 s, the received power value of the useful signal is below 25 for 3 s, and then it is determined that the channel quality has declined to the requirement for performing in-band spectrum sensing.

The useful signal here includes but will not be limited to one of the following useful signals:

a Received Signal Code Power (RSCP), a Reference Signal Received Quality (RSRQ), and Reference Signal Received Power (RSRP).

If the channel quality information includes feedback information, then preferably in the step 101, if the number of consecutively received NACKs is above a third liminal value, then the cognitive node determines that the channel quality has declined to the requirement for performing in-band spectrum sensing, for example, with the third liminal value of 5, 6 NACKs are received consecutively, and then it is determined that the channel quality has declined to the requirement for performing in-band spectrum sensing.

If the channel quality information includes a synchronization status, then preferably in the step 101, if a user equipment is out of synchronization with a base station for a preset third length of time (that is, uplink or downlink out-of-synchronization), then the cognitive node determines that the channel quality has declined to the requirement for performing in-band spectrum sensing.

If the channel quality information includes CRC information, then preferably in the step 101, if the number of CRCs received in a preset fourth length of time is above a fourth liminal value, then the cognitive node determines that the channel quality has declined to the requirement for performing in-band spectrum sensing, for example, with the fourth length of time of 10 s and the fourth liminal value of 6, 7 CRCs are received in 10 s, and then it is determined that the channel quality has declined to the requirement for performing in-band spectrum sensing.

The respective lengths of time and the respective liminal values mentioned above can be set from simulation or as particularly needed.

In the centralized scenario:

Preferably before the step 101, the method further includes the following steps.

Step A1. The cognitive nodes each determine from channel quality information and notify the central node of a channel quality condition.

Step A2. The central node judges from the channel quality conditions whether or not the channel quality has declined to the requirement for performing in-band spectrum sensing.

Step A3. The cognitive node determines that the channel quality has declined to the requirement for performing in-band spectrum sensing upon reception of an instruction to trigger spectrum sensing from the central node.

Particularly the channel quality information includes but will not be limited to at least one of the following information:

an interference value, a received power value of a useful signal, feedback information, a synchronization status and CRC information.

If the channel quality information includes an interference value, then preferably in the step A1, if the interference value is consecutively measured above a first liminal value for a preset first length of time, then the cognitive node determines that the channel quality has declined; otherwise, it determines that the channel quality has not declined.

If the channel quality information includes a received power value of a useful signal, then preferably in the step A1, if the received power value of the useful signal is consecutively below a second liminal value for a preset second length of time, then the cognitive node determines that the channel quality has declined; otherwise, it determines that the channel quality has not declined.

If the channel quality information includes feedback information, then preferably in the step A1, if the number of consecutively received NACKs is above a third liminal value, then the cognitive node determines that the channel quality has declined; otherwise, it determines that the channel quality has not declined.

If the channel quality information includes a synchronization status, then preferably in the step A1, if a user equipment is out of synchronization with a base station for a preset third length of time, then the cognitive node determines that the channel quality has declined; otherwise, it determines that the channel quality has not declined.

If the channel quality information includes CRC information, then preferably in the step A1, if the number of CRCs received in a preset fourth length of time is above a fourth liminal value, then the cognitive node determines that the channel quality has declined; otherwise, it determines that the channel quality has not declined.

The respective lengths of time and the respective liminal values mentioned above can be set from simulation or as particularly needed.

Since one part of an area throughout the network side may be in the centralized scenario and another part of the area may be in the distributed scenario, preferably, the identically denominated lengths of time and liminal values in the distributed and centralized scenarios may or may not be the same, for example, the first length of time in the distributed scenario and the first length of time in the centralized scenario may or may not be the same.

In order to save resources, a report can be made in 1 bit. For example, 1 can be reported for the presence that the channel quality has declined, and 0 can be reported for the absence that the channel quality has not declined. Following the foregoing disclosure, 1 can be reported to the central node upon determining that the channel quality has declined; otherwise, 0 can be reported.

Preferably in the step A2, the central node accumulates and processes the received channel quality conditions notified from the cognitive nodes and judges from a processing result whether or not the channel quality has declined to the requirement for performing in-band spectrum sensing.

Preferably, if the number of declines of channel quality among the received channel quality conditions is above a first threshold, then the central node determines that the channel quality has declined to the requirement for performing in-band spectrum sensing; or the central node determines a weight of each cognitive node from the distance between each cognitive node and a base station serving an authorized system in use and judges from the weights of the cognitive nodes and the received channel quality conditions whether or not the channel quality has declined to the requirement for performing in-band spectrum sensing.

With 1 reported when the channel quality has declined and 0 reported when the channel quality has not declined, the central node can firstly determine whether there is geographical location information of the authorized system and geographical location information of the cognitive nodes; and if not, then a statistic of report results is made in a preset period of time, and the report results of the cognitive nodes in the preset period of time are summed, and if a summation result is above a first threshold, then the cognitive nodes are triggered to perform spectrum sensing; or if so, then report results are weighted and summed according to the distance of the cognitive nodes from the base station where the authorized system resides, where a report result of a cognitive node at a shorter distance from the base station where the authorized system resides is weighted higher (that is, 1 is weighted), and on the contrary, the report result is weighted lower, and if a processing result is above a third threshold, then the cognitive nodes are triggered to perform spectrum sensing.

With 0 reported when the channel quality has declined and 1 reported when the channel quality has not declined, a process similar to the foregoing process will apply except for "below" instead of "above", and a repeated description thereof will be omitted here.

Preferably, before the step A2, the method further includes:
the central node attributes the cognitive nodes operating at the same frequency to a set.

Correspondingly in the step A2, if the number of declines of channel quality among channel quality conditions from the cognitive nodes in the same set is above a second threshold, then the central node determines that the channel quality has declined to the requirement for performing in-band spectrum sensing; or in the step A2, the central node determines for a set a weight of each cognitive node from the distance between each cognitive node and a base station serving an authorized system in use and judges from the weights of the cognitive nodes and the received channel quality conditions whether or not the channel quality has declined to the requirement for performing in-band spectrum sensing.

After the cognitive nodes are divided into sets, whether or not the channel quality corresponding to each set has declined to the requirement for performing in-band spectrum sensing can be judged respective per set.

Particular determination per set is similar to the foregoing determination without any division into sets, and a repeated description will be omitted here.

Preferably in the step A2, the central node triggers for a set each cognitive node in the set to perform in-band spectrum sensing upon determining that the channel quality has declined to the requirement for performing in-band spectrum sensing; or in the step A2, the central node determines for a set a base station serving an authorized system in use for the set and triggers all the cognitive nodes using the authorized system of the base station to perform in-band spectrum sensing upon determining that the channel quality has declined to the requirement for performing in-band spectrum sensing.

For example, only each cognitive node in a set A can be triggered to perform in-band spectrum sensing upon determining that the channel quality corresponding to the set A has declined to the requirement for performing in-band spectrum sensing; or a base station serving an authorized system in use for the set A can be determined, and all the cognitive nodes using the authorized system of the base station can be triggered to perform in-band spectrum sensing, that is, another set or sets than the set A may be involved.

The distributed scenario will be further described below by way of an example.

1. A cognitive node in a TD-SCDMA base station selects an initial sensing period, for example, a sensing period of 2 seconds (that is, the embodiment of the present invention can be used combining with an existing periodical sensing scenario).

2. The cognitive node in the TD-SCDMA base station makes a real-time statistic of an uplink interference level in 5 ms.

3. The statistic of interference is above a liminal value which is P times a statistic of the interference level over a long period of time, and then the cognitive node in the TD-SCDMA base station triggers a spectrum sensing module to perform a spectrum sensing process.

The centralized scenario will be further described below by way of an example.

1. Cognitive nodes in a TD-SCDMA base station select an initial sensing period according to a type of an authorized system available from a database, for example, a sensing period of 2 seconds (that is, the embodiment of the present invention can be used combining with an existing periodical sensing scenario).

2. The cognitive nodes in the TD-SCDMA base station make a real-time statistic of an uplink interference level in 5 ms.

3. All the cognitive nodes in the TD-SCDMA base station report 1-bit information synchronously to a central node at a report period of 20 ms, where the 1-bit information is reported particularly as 1 when the statistic of interference is above a liminal value which is P times a statistic of the interference level over a long period of time or as 0 when it is below the liminal value.

4. Each time the central node sums report results, and if a summation result is above a liminal value, then the central node triggers a spectrum sensing module of the network TD-SCDMA base station to perform a spectrum sensing process.

Figure 2:
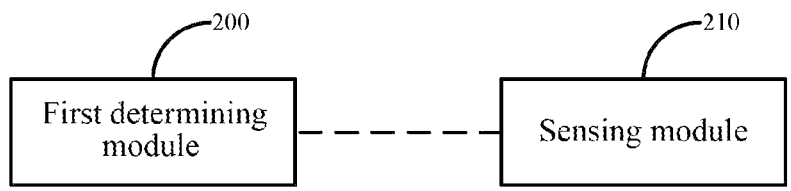
FIG. 2 is a schematic structural diagram of a cognitive node according to an embodiment of the invention.

As illustrated in FIG. 2, a cognitive node according to an embodiment of the invention includes a first determining unit 200 and a sensing module 210.

The first determining module 200 is configured to judge whether or not a channel quality has declined to a requirement for performing in-band spectrum sensing.

The sensing module 210 is configured to perform in-band spectrum sensing when it is determined that the channel quality has declined to the requirement for performing in-band spectrum sensing.

Preferably, the first determining module 200 judges from channel quality information whether or not the channel quality has declined to the requirement for performing in-band spectrum sensing.

Preferably, if the channel quality information includes an interference value, then if the interference value is consecutively measured above a first liminal value for a preset first length of time, then the first determining module 200 determines that the channel quality has declined to the requirement for performing in-band spectrum sensing.

If the channel quality information includes a received power value of a useful signal, then if the received power value of the useful signal is consecutively below a second liminal value for a preset second length of time, then the first determining module 200 determines that the channel quality has declined to the requirement for performing in-band spectrum sensing.

If the channel quality information includes feedback information, then if the number of consecutively received NACKs is above a third liminal value, then the first determining module 200 determines that the channel quality has declined to the requirement for performing in-band spectrum sensing.

If the channel quality information includes a synchronization status, then if a user equipment is out of synchronization with a base station for a preset third length of time, then the first determining module 200 determines that the channel quality has declined to the requirement for performing in-band spectrum sensing.

If the channel quality information includes CRC information, then if the number of CRCs received in a preset fourth length of time is above a fourth liminal value, then the first determining module 200 determines that the channel quality has declined to the requirement for performing in-band spectrum sensing.

Preferably, the first determining module 200 determines from channel quality information and notifies a central node of a channel quality condition and determines that the channel quality has declined to the requirement for performing in-band spectrum sensing upon reception of an instruction to trigger spectrum sensing from the central node.

Preferably, if the channel quality information includes an interference value, then if the interference value is consecutively measured above a first liminal value for a preset first length of time, then the first determining module 200 determines that the channel quality has declined; otherwise, it determines that the channel quality has not declined.

If the channel quality information includes a received power value of a useful signal, then if the received power value of the useful signal is consecutively below a second liminal value for a preset second length of time, then the first determining module 200 determines that the channel quality has declined; otherwise, it determines that the channel quality has not declined.

If the channel quality information includes feedback information, then if the number of consecutively received NACKs is above a third liminal value, then the first determining module 200 determines that the channel quality has declined; otherwise, it determines that the channel quality has not declined.

If the channel quality information includes a synchronization status, then if a user equipment is out of synchronization with a base station for a preset third length of time, then the first determining module 200 determines that the channel quality has declined; otherwise, it determines that the channel quality has not declined.

If the channel quality information includes CRC information, then if the number of CRCs received in a preset fourth length of time is above a fourth liminal value, then the first determining module 200 determines that the channel quality has declined; otherwise, it determines that the channel quality has not declined.

Figure 3:
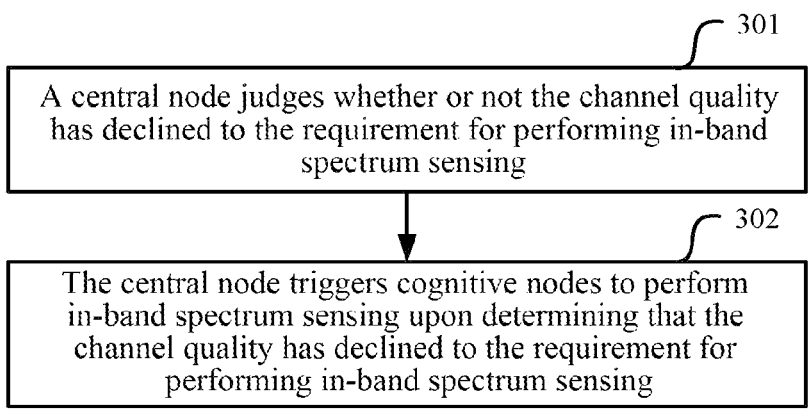
FIG. 3 is a schematic flow chart of a method for triggering spectrum sensing according to an embodiment of the invention.

As illustrated in FIG. 3, a method for triggering spectrum sensing according to an embodiment of the invention includes the following steps.

Step 301. A central node judges whether or not the channel quality has declined to the requirement for performing in-band spectrum sensing.

Step 302. The central node triggers cognitive nodes to perform in-band spectrum sensing upon determining that the channel quality has declined to the requirement for performing in-band spectrum sensing.

Preferably, in the step 301, the central node accumulates and processes received channel quality conditions notified from the cognitive nodes and judges from a processing result whether or not the channel quality has declined to the requirement for performing in-band spectrum sensing.

Preferably, if the number of declines of channel quality among the received channel quality conditions is above a first threshold, then the central node determines that the channel quality has declined to the requirement for performing in-band spectrum sensing; or the central node determines a weight of each cognitive node from the distance between each cognitive node and a base station serving an authorized system in use and judges from the weights of the cognitive nodes and the received channel quality conditions whether or not the channel quality has declined to the requirement for performing in-band spectrum sensing.

With 1 reported when the channel quality has declined and 0 reported when the channel quality has not declined, the central node can firstly determine whether there is geographical location information of the authorized system and geographical location information of the cognitive nodes; and if not, then a statistic of report results is made in a preset period of time, and the report results of the cognitive nodes in the preset period of time are summed, and if a summation result is above a first threshold, then the cognitive nodes are triggered to perform spectrum sensing; or if so, then report results are weighted and summed according to the distance of the cognitive nodes from the base station where the authorized system resides, where a report result of a cognitive node at a shorter distance from the base station where the authorized system resides is weighted higher (that is, 1 is weighted), and on the contrary, the report result is weighted lower, and if a processing result is above a third threshold, then the cognitive nodes are triggered to perform spectrum sensing.

With 0 reported when the channel quality has declined and 1 reported when the channel quality has not declined, a process similar to the foregoing process will apply except for "below" instead of "above", and a repeated description thereof will be omitted here.

Preferably, before the step 301, the method further includes:

the central node attributes the cognitive nodes operating at the same frequency to a set.

Correspondingly in the step 301, if the number of declines of channel quality among channel quality conditions from the cognitive nodes in the same set is above a second threshold, then the central node determines that the channel quality has declined to the requirement for performing in-band spectrum sensing; or in the step 301, the central node determines for a set a weight of each cognitive node from the distance between each cognitive node and a base station serving an authorized system in use and judges from the weights of the cognitive nodes and the received channel quality conditions whether or not channel quality has declined to the requirement for performing in-band spectrum sensing.

After the cognitive nodes are divided into sets, whether or not the channel quality corresponding to each set has declined to the requirement for performing in-band spectrum sensing can be judged respective per set.

Particular determination per set is similar to the foregoing determination without any division into sets, and a repeated description will be omitted here.

Preferably in the step 301, the central node triggers for a set each cognitive node in the set to perform in-band spectrum sensing upon determining that the channel quality has declined to the requirement for performing in-band spectrum sensing; or in the step 301, the central node determines for a set a base station serving an authorized system in use for the set and triggers all the cognitive nodes using the authorized system of the base station to perform in-band spectrum sensing upon determining that the channel quality has declined to the requirement for performing in-band spectrum sensing.

For example, only each cognitive node in a set A can be triggered to perform in-band spectrum sensing upon determining that the channel quality corresponding to the set A has declined to the requirement for performing in-band spectrum sensing; or a base station serving an authorized system in use for the set A can be determined, and all the cognitive nodes using the authorized system of the base station can be triggered to perform in-band spectrum sensing, that is, another set or sets than the set A may be involved.

The central node in the embodiment of the invention particularly functions similarly to the central node in the centralized scenario in FIG. 1, and a repeated description thereof will be omitted here.

Figure 4:
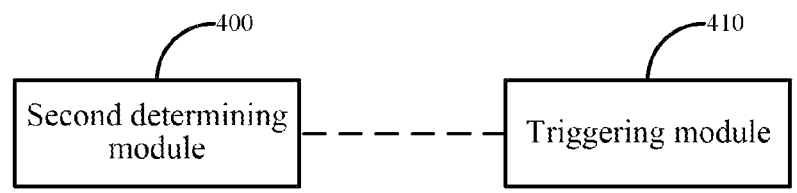
FIG. 4 is a schematic structural diagram of a central node according to an embodiment of the invention.

As illustrated in FIG. 4, a central node according to an embodiment of the invention includes a second determining module 400 and a triggering module 410.

The second determining module 400 is configured to judge whether or not a channel quality has declined to a requirement for performing in-band spectrum sensing.

The triggering module 410 is configured to trigger cognitive nodes to perform in-band spectrum sensing when it is determined that the channel quality has declined to the requirement for performing in-band spectrum sensing.

Preferably, the second determining module 400 accumulates and processes received channel quality conditions notified from the cognitive nodes and judges from a processing result whether or not the channel quality has declined to the requirement for performing in-band spectrum sensing.

Preferably, the second determining module 400 determines the channel quality has declined to the requirement for performing in-band spectrum sensing if the number of declines of channel quality among the received channel quality conditions is above a first threshold; or determines the weight of each cognitive node from the distance between each cognitive node and a base station serving an authorized system in use and judges from the weights of the sensing cognitive nodes and the received channel quality conditions whether or not the channel quality has declined to the requirement for performing in-band spectrum sensing.

Preferably, the second determining module 400 attributes the cognitive nodes operating at the same frequency to a set before judging whether or not the channel quality has declined to the requirement for performing in-band spectrum sensing.

Preferably, the second determining module 400 determines that the channel quality has declined to the requirement for performing in-band spectrum sensing upon determining that the number of declines of channel quality among channel quality conditions from the cognitive nodes in the same set is above a second threshold; or determines for a set the weight of each cognitive node from the distance between each cognitive node and a base station serving an authorized system in use and judges from the weights of the cognitive nodes and the received channel quality conditions whether or not the channel quality has declined to the requirement for performing in-band spectrum sensing.

Preferably, the triggering module 410 triggers for a set each cognitive node in the set to perform in-band spectrum sensing upon determining that the channel quality has declined to the requirement for performing in-band spectrum sensing; or determines for a set a base station serving an authorized system in use for the set and triggers all the cognitive nodes using the authorized system of the base station to perform in-band spectrum sensing upon determining that the channel quality has declined to the requirement for performing in-band spectrum sensing.

The central node in the embodiment of the invention particularly functions similarly to the central node in FIG. 3, and a repeated description thereof will be omitted here.

Figure 5:
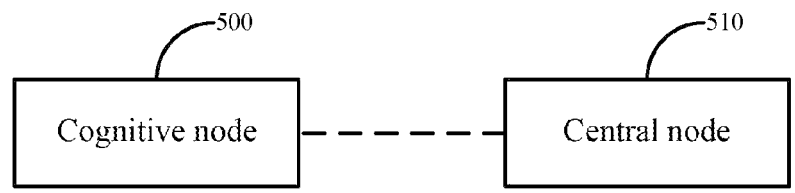
FIG. 5 is a schematic structural diagram of a system for performing spectrum sensing according to an embodiment of the invention.

As illustrated in FIG. 5, a system for performing spectrum sensing according to an embodiment of the invention includes cognitive nodes 500 and a central node 510.

The cognitive nodes 500 each are configured to determine from channel quality information and notify the central node of a channel quality condition and to determine that the channel quality has declined to the requirement for performing in-band spectrum sensing and perform in-band spectrum sensing upon reception of an instruction to trigger spectrum sensing from the central node.

The central node 510 is configured to judge from the received channel quality conditions whether or not the channel quality has declined to the requirement for performing in-band spectrum sensing and to trigger the cognitive nodes to perform in-band spectrum sensing upon determining that the channel quality has declined to the requirement for performing in-band spectrum sensing.

The cognitive nodes 500 in the embodiment of the invention particularly function similarly to the cognitive nodes in the centralized scenario in FIG. 1, and the central node 510 in the embodiment of the invention particularly functions similarly to the central node in the centralized scenario in FIG. 1, and a repeated description thereof will be omitted here.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable data processing device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

In the embodiments of the invention, in-band spectrum sensing is performed without setting a sensing period upon determining that the channel quality has declined to the requirement for performing in-band spectrum sensing, thereby avoiding the problems of degrading of a quality of service of an authorized system and a cognitive system or even a network breakdown due to interference therebetween caused by setting the sensing period too long, or an increase in power consumption of devices and a waste of spectrum resources caused by setting the sensing period too short.

Furthermore, with the means to adjust spectrum sensing dynamically, in the case that a system overhead is saved, the authorized system can be prevented as much as possible from interference for a long period of time and the cognitive system can be enabled to obviate interference from the authorized system in a timely manner, so the lowered overhead for performance of a detection process can consequently lower power consumption of a spectrum sensing process and improve the power endurance of a handheld device.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

What is claimed is:

1. A method for performing spectrum sensing, comprising:
    judging, by a cognitive node, whether or not a channel quality has declined to a requirement for performing in-band spectrum sensing; and
    performing, by the cognitive node, in-band spectrum sensing upon determining that the channel quality has declined to the requirement for performing in-band spectrum sensing.

2. The method according to claim 1, wherein judging by the cognitive node whether or not the channel quality has declined to the requirement for performing in-band spectrum sensing comprises:
    judging, by the cognitive node, from channel quality information whether or not the channel quality has declined to the requirement for performing in-band spectrum sensing.

3. The method according to claim 2, wherein the channel quality information includes at least one of the following information:
    an interference value, a received power value of a useful signal, feedback information, a synchronization status and Cyclic Redundancy Check, CRC, information.

4. The method according to claim 3, wherein judging by the cognitive node whether or not the channel quality has declined to the requirement for performing in-band spectrum sensing comprises at least one of:
    with the channel quality information including an interference value, if the interference value is consecutively measured above a first liminal value for a preset first length of time, then determining, by the cognitive node, that the channel quality has declined to the requirement for performing in-band spectrum sensing;
    with the channel quality information including a received power value of a useful signal, if the received power value of the useful signal is consecutively below a second liminal value for a preset second length of time, then determining, by the cognitive node, that the channel quality has declined to the requirement for performing in-band spectrum sensing;

with the channel quality information including feedback information, if the number of consecutively received NACKs is above a third liminal value, then determining, by the cognitive node, that the channel quality has declined to the requirement for performing in-band spectrum sensing;

with the channel quality information including a synchronization status, if a user equipment is out of synchronization with a base station for a preset third length of time, then determining, by the cognitive node, that the channel quality has declined to the requirement for performing in-band spectrum sensing; and with the channel quality information including CRC information, if the number of CRCs received in a preset fourth length of time is above a fourth liminal value, then determining, by the cognitive node, that the channel quality has declined to the requirement for performing in-band spectrum sensing.

5. The method according to claim 1, wherein before the cognitive node determines whether or not the channel quality has declined to the requirement for performing in-band spectrum sensing, the method further comprises:

determining from channel quality information and notifying, by the cognitive node a central node of a channel quality condition; and wherein judging by the cognitive node whether or not the channel quality has declined to the requirement for performing in-band spectrum sensing comprises:

determining, by the cognitive node, that the channel quality has declined to the requirement for performing in-band spectrum sensing upon reception of an instruction to trigger spectrum sensing from the central node.

6. The method according to claim 5, wherein the channel quality information includes at least one of the following information:

an interference value, a received power value of a useful signal, feedback information, a synchronization status and CRC information.

7. The method according to claim 6, wherein determining by the cognitive node the channel quality condition comprises at least one of:

with the channel quality information including an interference value, if the interference value is consecutively measured above a first liminal value for a preset first length of time, then determining by the cognitive node, that the channel quality has declined; otherwise, determining that the channel quality has not declined;

with the channel quality information including a received power value of a useful signal, if the received power value of the useful signal is consecutively below a second liminal value for a preset second length of time, then determining, by the cognitive node, that the channel quality has declined; otherwise, determining that the channel quality has not declined;

with the channel quality information including feedback information, if the number of consecutively received NACKs is above a third liminal value, then determining, by the cognitive node, that the channel quality has declined; otherwise, determining that the channel quality has not declined;

with the channel quality information including a synchronization status, if a user equipment is out of synchronization with a base station for a preset third length of time, then determining, by the cognitive node, that the channel quality has declined; otherwise, determining that the channel quality has not declined; or with the channel quality information including CRC information, if the number of CRCs received in a preset fourth length of time is above a fourth liminal value, then determining, by the cognitive node, that the channel quality has declined; otherwise, determining that the channel quality has not declined.

8. A method for triggering spectrum sensing, comprising:

judging, by a central node, whether or not a channel quality has declined to a requirement for performing in-band spectrum sensing; and triggering, by the central node, cognitive nodes to perform in-band spectrum sensing upon determining that the channel quality has declined to the requirement for performing in-band spectrum sensing.

9. The method according to claim 8, wherein judging by the central node whether or not the channel quality has declined to the requirement for performing in-band spectrum sensing comprises:

accumulating and processing, by the central node, received channel quality conditions notified from the cognitive nodes and judging from a processing result whether or not the channel quality has declined to the requirement for performing in-band spectrum sensing.

10. The method according to claim 9, wherein judging by the central node whether or not the channel quality has declined to the requirement for performing in-band spectrum sensing comprises:

determining, by the central node, that the channel quality has declined to the requirement for performing in-band spectrum sensing if the number of declines of channel quality among the received channel quality conditions is above a first threshold; or determining, by the central node, a weight of each cognitive node from the distance between each cognitive node and a base station serving an authorized system in use and judging from the weights of the cognitive nodes and the received channel quality conditions whether or not the channel quality has declined to the requirement for performing in-band spectrum sensing.

11. The method according to claim 8, wherein before the central node judges whether or not the channel quality has declined to the requirement for performing in-band spectrum sensing, the method further comprises:

attributing, by the central node, the cognitive nodes operating at the same frequency to a set; and wherein judging, by the central node, whether or not the channel quality has declined to the requirement for performing in-band spectrum sensing comprises:

determining, by the central node, that the channel quality has declined to the requirement for performing in-band spectrum sensing if the number of declines of channel quality among channel quality conditions from the cognitive nodes in the same set is above a second threshold; or determining, by the central node, for a set a weight of each cognitive node from the distance between each cognitive node and a base station serving an authorized system in use and judging from the weights of the cognitive nodes and the received channel quality conditions whether or not the channel quality has declined to the requirement for performing in-band spectrum sensing.

12. The method according to claim 11, wherein triggering by the central node the cognitive nodes to perform in-band spectrum sensing comprises:

triggering, by the central node, for a set each cognitive node in the set to perform in-band spectrum sensing upon determining that the channel quality has declined to the requirement for performing in-band spectrum sensing;

or determining, by the central node, for a set a base station serving an authorized system in use for the set and triggering all the cognitive nodes using the authorized system of the base station to perform in-band spectrum sensing upon determining that the channel quality has declined to the requirement for performing in-band spectrum sensing.

13. A device for performing spectrum sensing, comprising:
a first determining module configured to judge whether or not a channel quality has declined to a requirement for performing in-band spectrum sensing; and
a sensing module configured to perform in-band spectrum sensing when it is determined that the channel quality has declined to the requirement for performing in-band spectrum sensing.

14. The device according to claim 13, wherein the first determining module is further configured to judge from channel quality information whether or not the channel quality has declined to the requirement for performing in-band spectrum sensing, and wherein the first determining module is further configured:
with the channel quality information including an interference value, if the interference value is consecutively measured above a first liminal value for a preset first length of time, to determine that the channel quality has declined to the requirement for performing in-band spectrum sensing;
with the channel quality information including a received power value of a useful signal, if the received power value of the useful signal is consecutively below a second liminal value for a preset second length of time, to determine that the channel quality has declined to the requirement for performing in-band spectrum sensing;
with the channel quality information including feedback information, if the number of consecutively received NACKs is above a third liminal value, to determine that the channel quality has declined to the requirement for performing in-band spectrum sensing;
with the channel quality information including a synchronization status, if a user equipment is out of synchronization with a base station for a preset third length of time, to determine that the channel quality has declined to the requirement for performing in-band spectrum sensing; or
with the channel quality information including CRC information, if the number of CRCs received in a preset fourth length of time is above a fourth liminal value, to determine that the channel quality has declined to the requirement for performing in-band spectrum sensing.

15. The device according to claim 13, wherein the first determining module is further configured:
to determine from channel quality information and notify a central node of a channel quality condition and to determine that the channel quality has declined to the requirement for performing in-band spectrum sensing upon reception of an instruction to trigger spectrum sensing from the central node.

16. The device according to claim 15, wherein the first determining module is further configured:
with the channel quality information including an interference value, if the interference value is consecutively measured above a first liminal value for a preset first length of time, to determine that the channel quality has declined; otherwise, to determine that the channel quality has not declined;
with the channel quality information including a received power value of a useful signal, if the received power value of the useful signal is consecutively below a second liminal value for a preset second length of time, to determine that the channel quality has declined; otherwise, to determine that the channel quality has not declined;
with the channel quality information including feedback information, if the number of consecutively received NACKs is above a third liminal value, to determine that the channel quality has declined; otherwise, to determine that the channel quality has not declined;
with the channel quality information including a synchronization status, if a user equipment is out of synchronization with a base station for a preset third length of time, to determine that the channel quality has declined; otherwise, to determine that the channel quality has not declined; or
with the channel quality information including CRC information, if the number of CRCs received in a preset fourth length of time is above a fourth liminal value, to determine that the channel quality has declined; otherwise, to determine that the channel quality has not declined.

17. A device for triggering spectrum sensing, comprising:
a determining module configured to judge whether or not a channel quality has declined to a requirement for performing in-band spectrum sensing; and
a triggering module configured to trigger cognitive nodes to perform in-band spectrum sensing when it is determined that the channel quality has declined to the requirement for performing in-band spectrum sensing.

18. The device according to claim 17, wherein the determining module is further configured: to accumulate and process received channel quality conditions notified from the cognitive nodes and to judge from a processing result whether or not the channel quality has declined to the requirement for performing in-band spectrum sensing.

19. The device according to claim 18, wherein the determining module is further configured:
to determine that the channel quality has declined to the requirement for performing in-band spectrum sensing if the number of declines of channel quality among the received channel quality conditions is above a first threshold; or
to determine a weight of each cognitive node from the distance between each cognitive node and a base station serving an authorized system in use and to judge from the weights of the cognitive nodes and the received channel quality conditions whether or not the channel quality has declined to the requirement for performing in-band spectrum sensing.

20. The device according to claim 17, wherein the determining module is further configured:
to attribute the cognitive nodes operating at the same frequency to a set before judging whether or not the channel quality has declined to the requirement for performing in-band spectrum sensing; and
wherein the determining module is further configured: to determine that the channel quality has declined to the requirement for performing in-band spectrum sensing if the number of declines of channel quality among channel quality conditions from the cognitive nodes in the same set is above a second threshold; or to determine for a set a weight of each cognitive node from the distance between each cognitive node and a base station serving an authorized system in use and to judge from the weights of the cognitive nodes and the received channel quality conditions whether or not the channel quality has declined to the requirement for performing in-band spectrum sensing.

\* \* \* \* \*